United States Patent
Salvador Marcos

(10) Patent No.: US 9,865,037 B2
(45) Date of Patent: Jan. 9, 2018

(54) METHOD FOR UPSCALING AN IMAGE AND APPARATUS FOR UPSCALING AN IMAGE

(71) Applicant: THOMSON LICENSING, Issy les Moulineaux (FR)

(72) Inventor: Jordi Salvador Marcos, Hamburg (DE)

(73) Assignee: THOMSON LICENSING, Issy-Les-Moulineaux (FR)

( * ) Notice: Subject to any disclaimer, the term of this patent is extended or adjusted under 35 U.S.C. 154(b) by 0 days.

(21) Appl. No.: 14/757,594

(22) Filed: Dec. 23, 2015

(65) Prior Publication Data

US 2016/0180502 A1 Jun. 23, 2016

(30) Foreign Application Priority Data

Dec. 22, 2014 (EP) ..................................... 14307131

(51) Int. Cl.
- G06T 3/40 (2006.01)
- G06K 9/66 (2006.01)
- G06T 7/11 (2017.01)

(52) U.S. Cl.
CPC .............. G06T 3/4053 (2013.01); G06K 9/66 (2013.01); G06T 3/4007 (2013.01); G06T 7/11 (2017.01); G06T 2207/20081 (2013.01)

(58) Field of Classification Search
CPC ... G06T 3/4053; G06T 3/4007; G06T 7/0081; G06T 2207/20081; G06T 5/002; G06T 5/003; G06K 9/66; H04N 7/0117; H04N 7/0135; H04N 7/0152
USPC ........................................................ 382/155
See application file for complete search history.

(56) References Cited

U.S. PATENT DOCUMENTS

| | | | |
|---|---|---|---|
| 8,655,109 B2 | 2/2014 | Zhe et al. | |
| 2009/0074319 A1* | 3/2009 | Pan | G06T 3/4007 382/261 |
| 2013/0034313 A1* | 2/2013 | Lin | G06T 3/4053 382/299 |

FOREIGN PATENT DOCUMENTS

KR 101006810 1/2011

OTHER PUBLICATIONS

Yang et al: "Fast image super-resolution based on in-place example regression", IEEE, 2013.*
D'Angelo, E., "Patch-based methods for variational image processing problems", École Polytechnique Fédérale de Lausanne, PHD Thesis No. 5693, Apr. 26, 2013, pp. 1-144.

(Continued)

*Primary Examiner* — Ruiping Li
(74) *Attorney, Agent, or Firm* — Tutunjian & Bitetto, P.C.

(57) ABSTRACT

Known super-resolution algorithms are inefficient due to a high degree of redundant calculations, require search operations such as block matching for finding nearest neighbors, and achieve only small magnification factors. An improved method for upscaling an image comprises steps of upscaling the image by pixel interpolation to obtain a coarse upscaled image, and, for each pixel of the coarse upscaled image, determining a nonlinear regression function for a patch of pixels around a current pixel of the coarse upscaled image and enhancing the value of the current pixel by adding the result of the nonlinear regression function, wherein a pixel of an upscaled image is obtained. The nonlinear regression function is obtained from a trained regression tree, based on geometric features of the patch.

23 Claims, 3 Drawing Sheets

(56) References Cited

OTHER PUBLICATIONS

Datsenko et al., "Example-based single document image super-resolution: a global MAP approach with outlier rejection", Multi-dimensional Systems and Signal Processing, vol. 18, No. 2-3, Sep. 2007, pp. 103-121.

Timofte et al., "Anchored Neighborhood Regression for Fast Example-Based Super-Resolution", IEEE International Conference on Computer Vision (ICCV), Sydney, Australia, Dec. 1, 2013, pp. 1920-1927.

Veganzones et al., "Hyperspectral Super-Resolution of Locally Low Rank Images from Complementary Multisource Data", Faculty of Electrical and Computer Engineering, University of Iceland, Reykjawik, Iceland, Mar. 17, 2014, pp. 1-13.

Yang et al., "Fast Image Super-Resolution Based on In-Place Example Regression", IEEE Conference on Computer Vision and Pattern Recognition (CVPR), Portland, Oregon, USA, Jun. 23, 2013, pp. 1059-1066.

Yang et al., "Image Super-Resolution via Sparse Representation", IEEE Transactions on Image Processing, vol. 19, No. 11, May 18, 2010, pp. 2861-2873.

Zhang et al., "Example-based Super-Resolution Land Cover Mapping Using Support Vector Regression", IEEE Journal of Selected Topics in Applied Earth Observations and Remote Sensing, vol. 7, No. 4, Apr. 2014, pp. 1271-1283.

Atkins et al., "Tree-based resolution synthesis", Proceedings of the Image processing, Image Quality, Image Capture Systems Conference, Savannah, Georgia, USA, Apr. 1, 1999, pp. 1-6.

Li et al., "Single Image Super-Resolution Based on Support Vector Regression", International Joint Conference on Neural Networks, Orlando, Florida, USA, Aug. 12, 2007, pp. 2898-2901.

Ni et al., "Image Superresolution Using Support Vector Regression", IEEE Transactions on Image Processing, vol. 16, No. 6, Jun. 2007, pp. 1596-1610.

\* cited by examiner a)

a)   b)

METHOD FOR UPSCALING AN IMAGE AND APPARATUS FOR UPSCALING AN IMAGE

This application claims the benefit, under 35 U.S.C. §119 of European Patent Application No. 14307131.4, filed Dec. 22, 2014.

FIELD OF THE INVENTION

This invention relates to a method for upscaling an image and an apparatus for upscaling an image.

BACKGROUND

In [Timofte 2013], Anchored Nearest-Neighbor Regression (ANR) is proposed for fast and accurate Super-Resolution. Even though the proposed algorithm greatly speeds-up former patch regression approaches like [Yang 2010], it still requires (1) efficiently determining the nearest anchored regressor and (2) computing the regression for all pixels in each overlapping patch and then linearly combining the contributions from overlapping patches. For determining the nearest anchored regressor, a linear search is suggested.

In [Yang 2013], In-place Example Regression (IER) is proposed for combining classical techniques from single-image super resolution with trained regressor priors. [Yang2013] views the patch-based single image super-resolution problem as a regression problem, i.e. finding a mapping function f from the low-resolution patch space to the target high-resolution patch space. Even though the authors seem to indicate they do not need to perform a search for suitable cross-scale similar examples, an in-depth analysis of the algorithm shows that a small search window of size 3×3 is still required to find the most suitable cross-scale example. Further, the disclosed algorithm still requires computing the IER for overlapping patches and linearly combining the overlapping computed contributions. Furthermore, this technique requires an iterative application with small magnification factor to correctly exploit the cross-scale prior.

The above-described ANR and IER approaches have some drawbacks. The drawbacks comprise at least that (1) it is inefficient to determine the regressor for each contribution, (2) block matching is required for finding cross-scale nearest neighbors, (3) computations are redundant when done for all pixels in each patch, whereby it needs to be kept in mind that pixels distant from the center of a patch will generally show poor regression performance, and (4) only small magnification factors can be achieved, or multiple steps are required to estimate the super-resolved image for larger magnification factors, such as e.g. 3×.

Binary partition trees are well-known data structures for fast data retrieval, among other applications.

SUMMARY OF THE INVENTION

The present invention solves at least some of the above-mentioned drawbacks.

According to an embodiment, a method for upscaling an image comprises steps of upscaling the image by pixel interpolation to obtain a coarse upscaled image, and for each pixel of the coarse upscaled image, enhancing its value by adding the result of a nonlinear regression function that is applied to a patch of at least 3×3 pixels around the pixel. In other words, the patch comprises in each direction at least one pixel that is adjacent to a current pixel, and the current pixel is the center of the patch. Pixels adjacent to a current pixel are not modified. In an embodiment, the nonlinear regression function is obtained by traversing a regression tree structure according to features of the patch. The regression tree structure is obtained by training or machine learning.

In one embodiment, an apparatus for upscaling an image comprises at least one hardware component, such as a hardware processor, and a non-transitory, tangible, computer-readable storage medium tangibly embodying at least one software component, the software component when executing on the at least one hardware component causing upscaling the image by pixel interpolation to obtain a coarse upscaled image, and for each pixel of the coarse upscaled image, enhancing its value by adding the result of a nonlinear regression function that is applied to a patch of at least 3×3 pixels around the pixel.

In one embodiment, a computer readable medium has stored thereon executable instructions to cause a computer to perform a method comprising steps of upscaling the image by pixel interpolation to obtain a coarse upscaled image, and for each pixel of the coarse upscaled image, enhancing its value by adding the result of a nonlinear regression function that is applied to a patch of at least 3×3 pixels around the pixel.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a general overview and exemplary regression tree.

DETAILED DESCRIPTION OF THE INVENTION

Figure 1:
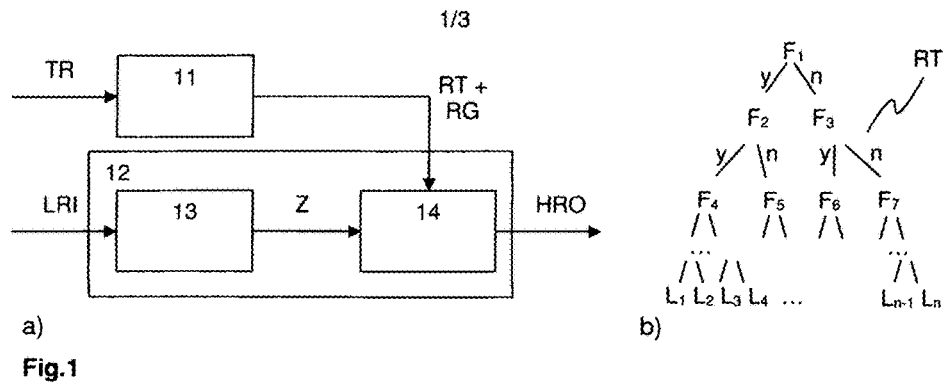

A general overview of the disclosed solution, in one embodiment, is shown in FIG. 1 *a*). As most machine-learning approaches, it comprises an offline training stage 11 and an on-line inference stage 12. The training stage is used to generate a non-linear regression scheme, based on a binary partition tree RT and a set of regressors RG, each regressor corresponding to a leaf node in the binary partition tree. This is described in more detail further below. The inference stage 12 comprises a linear upscaling stage 13 and a central-pixel non-linear regression (CPNLR) stage 14. In the following, a framework of the disclosed training and inference methods is described.

During the offline training stage 11, a set of optimal regressors RG as well as a binary partition tree structure RT are computed. The set of optimal regressors RG is computed from training pairs of high-resolution and low-resolution images TR. The regressors are optimal for the given training pairs, and thus also for all similar images. Thus, the regressors are applied to low-resolution input images LRI in order to generated high-resolution output images HRO. FIG. 1 b) shows an exemplary binary partition tree structure or regression tree RT. Each node of the tree is either a decision node $F_1, \ldots, F_7$ or a leaf node $L_1, \ldots, L_n$. In each decision node it is determined whether or not a particular feature exists in the input patch. Each leaf node is associated with a regressor RG, which will be applied to an input patch that—due to its features—ends in the respective leaf node. The feature are generally geometric features, but can also be other features, such as e.g. color. Other exemplary features are an edge or a gradient in any particular direction, such as horizontal, vertical, 30°, 45°, etc. Decision nodes that are on the same logical level of the tree, such as $F_2$ and $F_3$, can but need not test different features. The features that are tested at the decision nodes and the regressors that are associated with the leaf nodes result from the training stage. Therefore, the binary partition tree structure RT is capable of determining an optimal regressor for a given patch. Moreover, the optimal regressor is determined in logarithmic time. That is, for a given tree depth d the search time goes with log(d). During the online inference stage 12, the low-resolution input image LRI is first upscaled, whereby any interpolation method (e.g. bicubic) is used. Then, around each output pixel of the first upscaled input image, a patch of dimensions P×P pixels is cropped and used to traverse the tree structure RT. The traversal ends at a leaf node $L_1, \ldots, L_n$ that has associated a regressor. The regressor corresponding to the leaf node is then applied to the input patch and provides additional information to complement the interpolated pixel.

The regression tree RT may be implemented in various ways for a hardware component (such as a processor) to generate and apply it to image patches. For example, it may be implemented as a look-up table (LUT) that for each combination of features $F_1, \ldots, F_7$ on its input provides a regressor RG on its output.

One way of applying nonlinear regression consists in combining binary partition trees for space partitioning with linear models adapted to each of the tree leaves or subspaces, under the assumption of local linearity. In the following, this model is adopted and exploited for obtaining fast high-quality super-resolution upscaling.

Given an input low-resolution image Y, the goal of a nonlinear regressor f( ) is to estimate the high-resolution image X as X=f(Y). Under the assumption that linear interpolation-based upscaling (e.g. bicubic resizing) provides a reasonable coarse estimate of the unknown high-resolution image X, a better-posed problem is that of estimating the missing detail D=X−Z=g(Z), where Z=bic(Y) is the linearly interpolated approximation and g( ) is again a nonlinear regressor, but easier to model than the original f( ). The estimate of X will thus be obtained as X=Z+g(Z), so that in principle the nonlinear regression can be understood as a correction of the errors introduced by bicubic upscaling.

Figure 2:
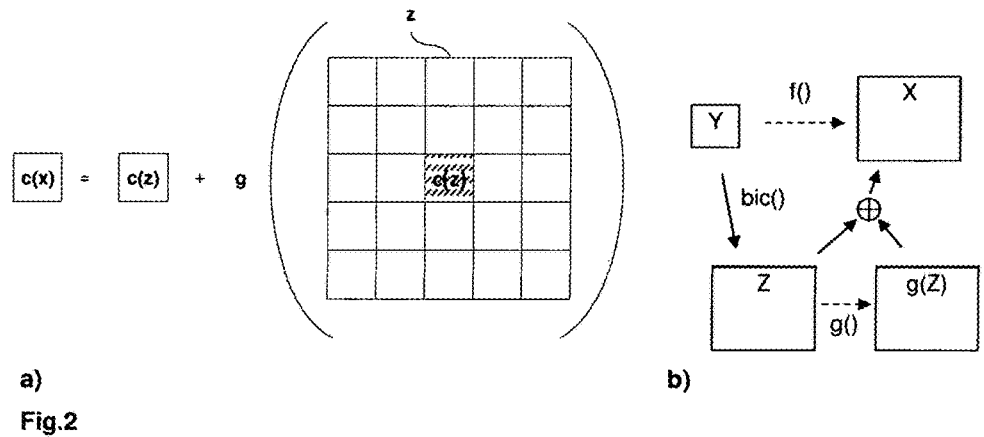
FIG. 2 an inference model for Central-Pixel Nonlinear Regression (CPNLR)

In the following, the Inference model is described. The general principle is also shown in FIG. 2 b). Let Z=bic(Y) be the coarse, interpolation-based estimate of the desired high-resolution image X, and z a small patch of size P×P pixels (with odd P, e.g. P=3) centered at one of the pixels of Z. Let also c(x) be a pixel of the desired image X at the same spatial location as the center of z, c(z), and the patch x containing the neighborhood of c(x). The nonlinear regressor g( ) is applied solely onto the patch z, resulting in c(z)+g(z)=c(x). In other words, each final high-resolution pixel c(x) is computed as a nonlinear correction, using g( ), regressed from its neighborhood z, and applied onto a linearly interpolated coarse approximation c(z), as shown in FIG. 2 a).

This approach is referred to as Central-Pixel Nonlinear Regression (CPNR) herein, since g( ) is a nonlinear regression function operating on the coarse patch z to generate the central high-resolution pixel c(x).

Figure 3:
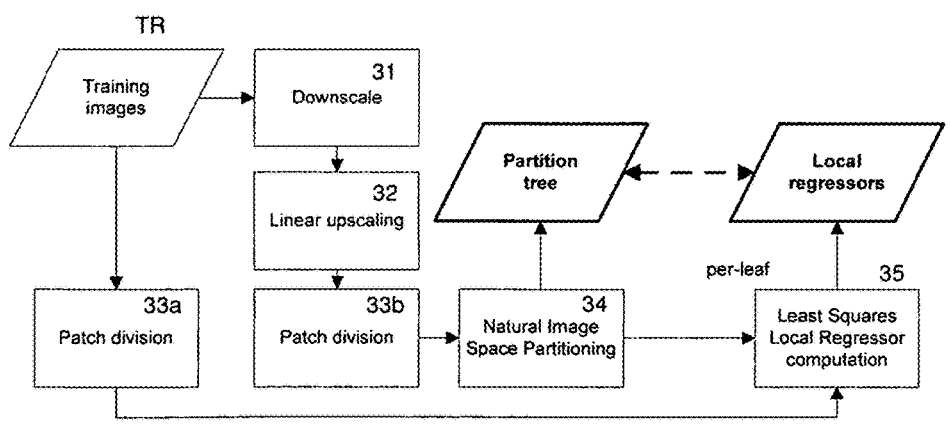
FIG. 3 a block diagram for nonlinear regressor training.

FIG. 3 shows an overview of the training stage, in one embodiment. The goal of the training is to obtain the nonlinear regressor g( ) consisting of a binary partition tree and a collection of locally linear regressors, each attached to one leaf of the tree. First, the training images TR are downscaled 31 by the target upscaling factor s (e.g. s=2, 3, 4, . . . ). Then, the downscaled training images are linearly upscaled 32 (e.g. using bicubic interpolation) by the upscaling factor s. This generates coarse estimates of the training images obtained by upscaling with the desired upscaling factor that will be used during inference, as described further below. Let {X} be the set of sharp high-resolution training images and {Z} the set of linearly upscaled coarse approximations, thus following the notation used above. Both sets of images are divided 33a,33b into P×P-sized patches, resulting in two new patch sets {x} and {z}. In one embodiment, the P×P-sized patches are overlapping. The next step is Natural Image Space Partitioning 34 that is applied to the patches {z} of the coarse approximation. Binary partition trees are well-known data structures for fast data retrieval, among other applications. According to an embodiment, a binary partition tree structure is adopted in order to determine one mode, or cluster, or subspace of the training set to be used. This is performed via automatic clustering. In an embodiment, this clustering is optimally performed in a least-squares sense, by means of Principal Component Analysis (PCA). In another embodiment, any other well-known clustering method is used.

Let Z be a matrix obtained by stacking a column-vectorized representation of the zero-mean normalized patches (Euclidean norm) in {z}. If PP=P×P (the number of pixels per patch) and the total number of patches is N, then Z is a PP×N matrix, where PP is the number of rows and N the number of columns.

Figure 4:
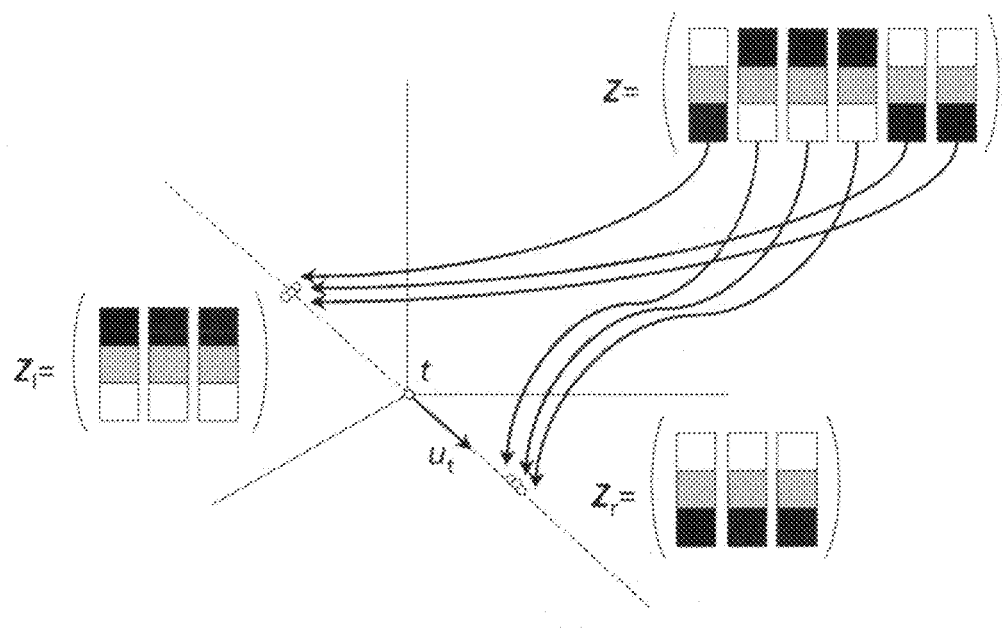
FIG. 4 partition of a (sub)space within a 3-dimensional space into two new subspaces.

Let $USV^T$ be the Singular Value Decomposition of Z (or a subset of the columns of Z), where U, S and $V^T$ are sorted following decreasing singular values (in S). Then, the first column of U, namely $u_r$, defines the direction of maximum variation of Z (or a subset of the columns of Z), and is thus picked as optimal splitting axis for the root (or current) node. Then, all columns of Z are projected (inner product) onto this axis and a threshold t is picked as the median value of all projections, so that half of the columns (patches) of Z ({Z}) lie above the threshold and the other half below, producing respectively right and left child nodes and data subsets. A graphical example with reduced dimensionality is shown in FIG. 4, where a (sub-) space within a 3-dimensional space is partitioned into two new subspaces.

This procedure is recursively applied onto the current subset of {Z} until reaching a desired number of clusters (or subspaces, or leaf nodes in the tree). It results in a plausible partition of natural image patches if the training dataset is ample enough. Given a desired number of clusters $N=2^M$, we can refer by $\{z\}_n$, for n=1, . . . , N, to the set of patches lying in one of the trained natural image subspaces. Correspondingly, $Z_n$ is the column-stacked matrix form.

Now, Least Squares Local Regressor computation 35 is described. The optimal regressor g( ), according to the inference model introduced above, should be able to complement the linearly interpolated coarse version of the patch's central pixel to generate a close estimate of the real high-resolution pixel. Since a natural image space partition means has been built (namely the partition tree), it is now possible to perform locally linear regression under the assumption that patches with similar appearance (ie. lying in the same subspace) will experience similar degradations when going from a high-resolution scale to a low-resolution scale.

Let $\{m\}_n$ be the set of mean values of the floating normalized patches falling in the subspace $\{z\}_n$ (ie. the $n^{th}$ tree leaf), $\{v\}_n$ the corresponding floating but un-normalized patches (before normalization) and $c(\{x\}_n)$ the corresponding high-resolution original patch centers. Let finally $c(\{z\}_n)$ be updated to become the center of the non-floating, un-normalized version used above (equivalent to $c(\{z\}_n):=c(\{v\}_n)+\{m\}_n$, where the mean values are added to each un-normalized patch center). Accordingly, let $X_n$, $V_n$ and $Z_n$ be the corresponding stacked-column matrix forms of the high-resolution original patch centers (one row), floating un-normalized upscaled patches (P×P rows) and upscaled patch centers (one row).

Then, the ideal local linear regressor should accomplish that $X_n = Z_n + G_n * V_n$, where $G_n$ is a 1×(P×P) matrix (a single vector) to be determined. With a proper training set, this is an over-constrained problem, so it can be solved by linear least squares. An over-constrained problem has more constraints or observations than unknowns. The least squares solution is $G_n = (X_n - Z_n) V_n^T (V_n V_n^T)^{-1}$. Additionally, the local estimation can be regularized for improved stability, resulting in the expression $G_n(1+\lambda)(X_n - Z_n) V_n^T (V_n V_n^T + \lambda I)^{-1}$, where $\lambda \ll 1$ is a small regularization parameter and $I$ is an identity matrix. $G_n$ is the set of locally linear regressors. The combination of the space partitioning tree and the locally linear regressor provides a good approximation of a globally nonlinear regressor g( ) for each patch.

Figure 5:
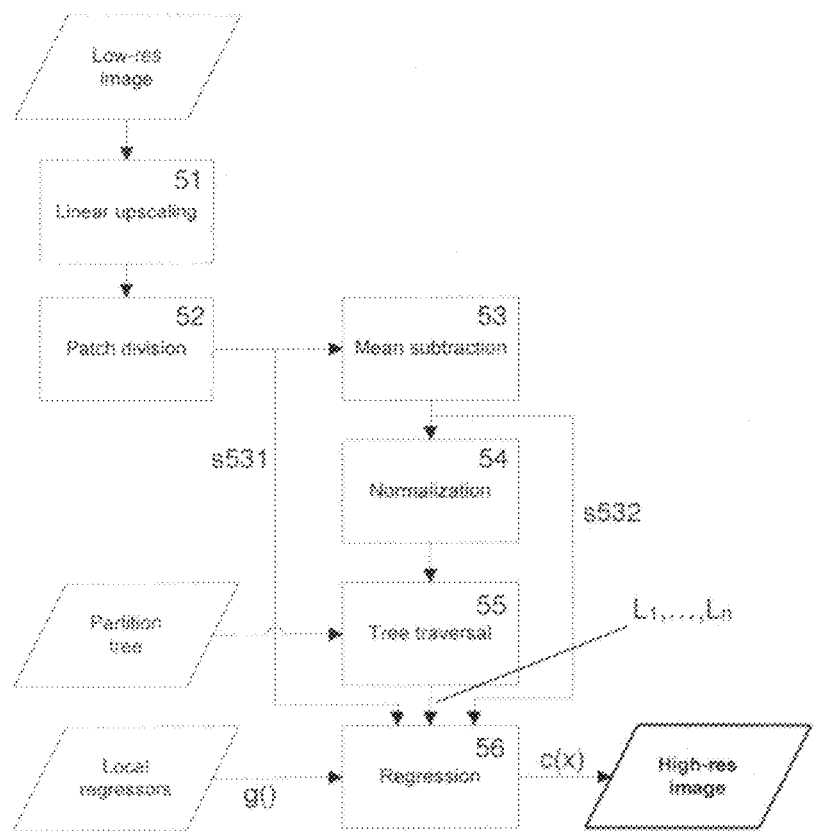
FIG. 5 a block diagram for regression-based super-resolution upscaling.

The following is a description of the inference stage. An overview block diagram for the inference stage is shown in FIG. 5. The process comprises a linear upscaling 51 of the low-resolution image by means of a linear interpolation method (e.g. bicubic upscaling), followed by a division 52 into odd-sized (e.g. 3×3, 5×5, 3×5, 5×3 pixels) overlapping patches. Note that in the inference model described above, only the central pixel of each patch is reconstructed. Thus, the patches must overlap. Then, for each patch, the floating version is constructed by subtracting the patch mean 53, and the normalized version is subsequently obtained by (Euclidean norm) normalization 54. Using the normalized version of each patch, the corresponding subspace is determined by traversing 55 the binary partition tree that was obtained, in one embodiment, during training. In other embodiments, the binary partition tree can be pre-defined, or obtained by another algorithm, or simply retrieved from a storage. Next, using the original patch's s531 central pixel, the surrounding floating (zero-mean) patch s532 and the local regressor g(z) corresponding to the selected subspace (ie. leaf node $L_1, \ldots, L_n$), the final enhanced pixel value c(x) is obtained by regression 56. The final enhanced pixel is written onto the output image buffer, as being the pixel located at the same position as the patch center. After all pixels have been processed, the output image buffer stores the final high-resolution image HRO.

Figure 6:
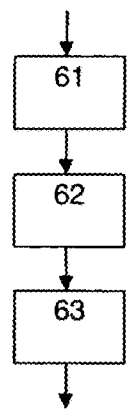
FIG. 6 a flow-chart of a method for upscaling an image, in one embodiment.

FIG. 6 shows a flow-chart of a method for upscaling an image, in one embodiment. The method comprises upscaling 61 the image Y by pixel interpolation to obtain a coarse upscaled image Z, and, for each pixel of the coarse upscaled image Z, calculating or determining 62 a nonlinear regression function g( ) for a patch z of at least 3×3 pixels around a current pixel c(z) of the coarse upscaled image Z, and enhancing 63 the value of the current pixel by adding the result of the nonlinear regression function g(z), wherein a pixel c(x) of an upscaled image X is obtained.

Figure 7:
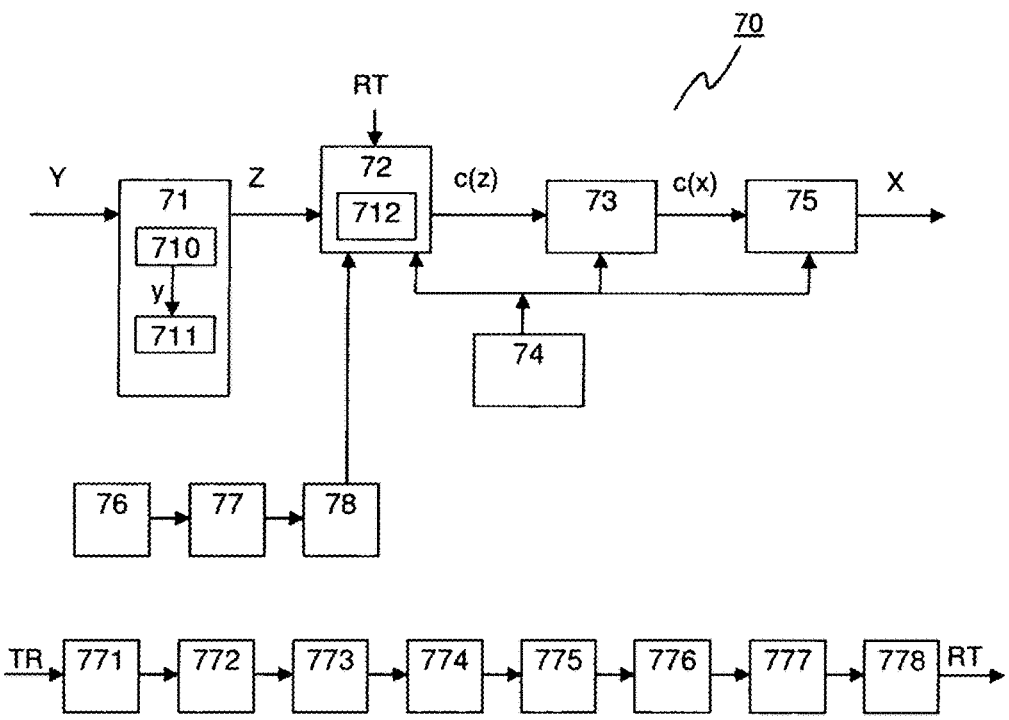
FIG. 7 the structure of an apparatus for upscaling an image, in one embodiment.

FIG. 7 shows the structure of an apparatus 70 for upscaling an image, in one embodiment. The apparatus comprises an interpolation module 71 adapted for upscaling the image Y by pixel interpolation to obtain a coarse upscaled image Z, a first processing module 72 adapted for calculating or determining a nonlinear regression function g( ) for a patch z of at least 3×3 pixels around a current pixel c(z) of the coarse upscaled image Z, a second processing module 73 adapted for enhancing the value of the current pixel c(z) by adding the result of the nonlinear regression function g(z), wherein a pixel c(x) of an upscaled image X is obtained, a control unit 74 adapted for controlling the first and second processing modules 72,73 to process each pixel of the coarse upscaled image Z, and a memory 75 adapted for storing the pixels c(x) of the upscaled image X. The adapting of the first and second processing modules 72,73 can be achieved e.g. by software.

In one embodiment, the apparatus further comprises a partition tree computation module 76 adapted for computing a binary partition tree structure according to features of training pairs of high-resolution and low-resolution images, a training image analysis module 77 adapted for computing, for each leaf of the binary partition tree structure, a nonlinear regression function from the training pairs, and a storage module 78 adapted for associating the nonlinear regression function with the respective leaf.

In one embodiment, the apparatus further comprises a patch generating module 710 for dividing the input image into overlapping patches y, and a patch analysis module 711 adapted for determining, for each patch, a plurality of geometric features $F_1, \ldots, F_n$.

In one embodiment, the apparatus further comprises a regression function determining module 712 adapted for traversing the partition tree structure RT according to the features of the patch, wherein the regression function is determined as being associated with a partition tree leaf $(L_1, \ldots, L_n)$. In one embodiment, at least one of the patch generating module 710 and the patch analysis module 711 is incorporated in the interpolation module 71. In one embodiment, the regression function determining module 712 is incorporated in the first processing module 72.

In one embodiment, the apparatus further comprises a downscaling module 771 adapted for downscaling 31 a training image, an upscaling module 772 adapted for upscaling 32 the downscaled training image, wherein a coarse version of the training image is obtained, an image division module 773 adapted for dividing the coarse version of the training image into patches, a normalizing module 774 adapted for normalizing the patches, a matrix calculation module 775 adapted for generating a patch matrix Z by stacking a column-vectorized representation of the zero-mean normalized patches, the patch matrix Z having a dimension of PP×N, wherein PP=P×P is the number of pixels per patch and N is the number of patches per training image, a Singular Value Decomposition module 776 adapted for calculating a Singular Value Decomposition of the patch matrix Z or a subset of the columns of the patch matrix Z, where S is a diagonal matrix of singular values and U, S and $V^T$ are sorted following decreasing singular values in S, a patch analysis module 777 adapted for determining a direction of maximum variation of the patch matrix Z by calculating the first column of U, wherein the direction of maximum variation is picked as an optimal splitting axis for a current node of the tree structure RT, and for projecting all columns of the patch matrix Z onto the optimal splitting axis, and a feature decision module 778 adapted for determining a median value of all projections and selecting the median value as a threshold t, determining for each patch whether the projection of its corresponding column in the patch matrix Z is above the threshold t, and assigning each patch to one of two sub-sets of the current node, depending on whether or not the projection of its corresponding column in the patch matrix Z is above the threshold t.

One advantage of the invention is that it allows the inferring of high-frequency (ie. detail) information and correct aliasing artifacts due to the interpolation process. Even though the training stage may be costly, both in terms of memory and CPU usage, it often needs to be performed only once, given a sufficiently complete set of training images.

The disclosed central-pixel non-linear regression scheme can also be used for other classical image processing problems. In one embodiment, the central-pixel non-linear regression scheme is used for denoising images. In one embodiment, the central-pixel non-linear regression scheme is used for deblurring images.

One advantage of the invention, as compared to existing methods, is that existing methods are either costlier, like the ones mentioned in Background, or poorer alternatives where no fine detail is reconstructed, like the well-known simple interpolation-based upscaling. Further, the binary partition tree traversal and the computation of the regression require a reduced number of memory accesses when compared to other, known approaches.

As has become clear from the above, the present invention relies on trained regression-based mapping, rather than for example nearest neighbor embedding. Further, the present invention does not require any combination of two or more contributions for any pixel of the high-resolution output image HRO. Instead, each pixel is obtained separately and completely. This has several advantages, for example reduced processing power, since no iterations are necessary. Further, the upscaling operates only locally, which makes any search operations obsolete. No patch matching is required, which further reduces requirements for processing power.

It is noted that the use of the verb "comprise" and its conjugations does not exclude the presence of elements or steps other than those stated in a claim. Furthermore, the use of the article "a" or "an" preceding an element does not exclude the presence of a plurality of such elements. Several "means" may be represented by the same item of hardware. Storage elements, such as memories, may be required without being mentioned, as is obvious for the skilled reader. Furthermore, the invention resides in each and every novel feature or combination of features.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to upsampling, one skilled in the art would recognize that the method and apparatus described herein may be applied to denoising, deblurring and other image processing techniques. It is expressly intended that all combinations of those elements that perform substantially the same function in substantially the same way to achieve the same results are within the scope of the invention. Substitutions of elements from one described embodiment to another are also fully intended and contemplated.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections. Reference numerals appearing in the claims are by way of illustration only and shall have no limiting effect on the scope of the claims.

CITED REFERENCES

[Timofte 2013]: "Anchored Neighborhood Regression for Fast Example-Based Super-Resolution", R. Timofte, V. De Smet, L. Van Gool, Internat. Conference on Computer Vision (ICCV 2013)

[Yang 2010]: "Image Super-Resolution via Sparse Representation", J. Yang, J. Wright, T. Huang, Y. Ma, IEEE Transactions on Image Processing, 19(11), 2010

[Yang 2013]: "Fast Image Super-resolution Based on In-place Example Regression", J. Yang, Z. Lin, S. Cohen, CVPR2013 (via IEEE explore)

The invention claimed is:

1. A method for upscaling an image, comprising:
   upscaling an image at a first resolution by pixel interpolation to obtain a coarse upscaled image at a second resolution, the second resolution being higher than the first resolution; and
   for each pixel of the coarse upscaled image,
   determining a nonlinear regression function for a patch of at least 3×3 pixels around a current pixel of the coarse upscaled image; and
   enhancing a value of the current pixel of the coarse upscaled image by adding a result of the nonlinear regression function, wherein a pixel of an enhanced upscaled image at the second resolution is obtained and wherein pixels adjacent to the current pixel are not modified.

2. The method of claim 1, wherein the nonlinear regression function is determined according to a binary partition tree structure.

3. The method of claim 2, wherein the binary partition tree structure is traversed according to geometric features of the patch.

4. The method of claim 1, wherein the coarse upscaled image has the same size as the upscaled image.

5. The method of claim 1, further comprising
   computing a binary partition tree structure according to features of training pairs of high-resolution and low-resolution images;
   computing, for each leaf of the binary partition tree structure, a nonlinear regression function from the training pairs; and
   associating the nonlinear regression function with the respective leaf.

6. The method according to claim 5, wherein the computing a binary partition tree structure comprises
   downscaling a training image;
   upscaling the downscaled training image, wherein a coarse version of the training image is obtained;
   dividing the coarse version of the training image into patches;

normalizing the patches;
generating a patch matrix Z by stacking a column-vectorized representation of the zero-mean normalized patches, the patch matrix Z having a dimension of PP×N, wherein PP=P×P is the number of pixels per patch and N is the number of patches per training image;
calculating a Singular Value Decomposition of the patch matrix Z or a subset of the columns of the patch matrix Z, where S is a diagonal matrix of singular values and U, S and $V^T$ are sorted following decreasing singular values in S;
determining a direction of maximum variation of the patch matrix Z by calculating the first column of U, wherein the direction of maximum variation is picked as an optimal splitting axis for a current node of the tree structure;
projecting all columns of the patch matrix Z onto the optimal splitting axis;
determining a median value of all projections and selecting the median value as a threshold t;
determining for each patch whether the projection of its corresponding column in the patch matrix Z is above the threshold t, and
assigning each patch to one of two sub-sets of the current node, depending on whether or not the projection of its corresponding column in the patch matrix Z is above the threshold t.

7. The method of claim 1, further comprising
dividing the input image into overlapping patches;
for each patch, determining a plurality of geometric features as used by the binary partition tree structure; and
traversing the partition tree structure according to the features of the patch, wherein the regression function is determined as being associated with a partition tree leaf.

8. The method according to claim 1, wherein the pixel interpolation used for upscaling the image is bicubic interpolation.

9. An apparatus for upscaling an image, comprising
a processor and
a memory storing instructions that, when executed, cause the apparatus to perform a method for upscaling an image at a first resolution, the method comprising
upscaling the image at the first resolution by pixel interpolation to obtain a coarse upscaled image at a second resolution, the second resolution being higher than the first resolution; and
for each pixel of the coarse upscaled image,
determining a nonlinear regression function for a patch of at least 3×3 pixels around a current pixel of the coarse upscaled image; and
enhancing a value of the current pixel of the coarse upscaled image by adding a result of the nonlinear regression function, wherein a pixel of an enhanced upscaled image at the second resolution is obtained and wherein pixels adjacent to the current pixel are not modified.

10. The apparatus according to claim 9, wherein the nonlinear regression function is determined according to a binary partition tree structure.

11. The apparatus according to claim 10, wherein the binary partition tree structure is traversed according to geometric features of the patch.

12. The apparatus according to claim 9, wherein the coarse upscaled image has the same size as the upscaled image.

13. The apparatus according to claim 9, wherein the method further comprises
computing a binary partition tree structure according to features of training pairs of high-resolution and low-resolution images;
computing, for each leaf of the binary partition tree structure, a nonlinear regression function from the training pairs; and
associating the nonlinear regression function with the respective leaf.

14. The apparatus according to claim 13, wherein the computing a binary partition tree structure further comprises
downscaling a training image;
upscaling the downscaled training image, wherein a coarse version of the training image is obtained;
dividing the coarse version of the training image into patches;
normalizing the patches;
generating a patch matrix Z by stacking a column-vectorized representation of the zero-mean normalized patches, the patch matrix Z having a dimension of PP×N, wherein PP=P×P is the number of pixels per patch and N is the number of patches per training image;
calculating a Singular Value Decomposition of the patch matrix Z or a subset of the columns of the patch matrix Z, where S is a diagonal matrix of singular values and U, S and $V^T$ are sorted following decreasing singular values in S;
determining a direction of maximum variation of the patch matrix Z by calculating the first column of U, wherein the direction of maximum variation is picked as an optimal splitting axis for a current node of the tree structure;
projecting all columns of the patch matrix Z onto the optimal splitting axis;
determining a median value of all projections and selecting the median value as a threshold t;
determining for each patch whether the projection of its corresponding column in the patch matrix Z is above the threshold t, and
assigning each patch to one of two sub-sets of the current node, depending on whether or not the projection of its corresponding column in the patch matrix Z is above the threshold t.

15. The apparatus according to claim 9, wherein the method further comprises
dividing the input image into overlapping patches;
for each patch, determining a plurality of geometric features as used by the binary partition tree structure; and
traversing the partition tree structure according to the features of the patch, wherein the regression function is determined as being associated with a partition tree leaf.

16. The apparatus according to claim 9, wherein the pixel interpolation used for upscaling the image is bicubic interpolation.

17. An apparatus for upscaling an image, comprising
an interpolation module for upscaling the image at a first resolution by pixel interpolation to obtain a coarse upscaled image at a second resolution, the second resolution being higher than the first resolution;

a first processing module for determining a nonlinear regression function for a patch of at least 3×3 pixels around a current pixel of the coarse upscaled image;

a second processing module for enhancing a value of the current pixel of the coarse upscaled image by adding a result of the nonlinear regression function, wherein a pixel of an enhanced upscaled image at the second resolution is obtained, and wherein pixels adjacent to the current pixel are not modified;

a control unit for controlling the first and second processing modules to process each pixel of the coarse upscaled image; and a memory for storing the pixels of the upscaled image.

18. The apparatus according to claim 17, wherein the first processing module determines said nonlinear regression function according to a binary partition tree structure.

19. The apparatus according to claim 17, wherein the coarse upscaled image has the same size as the upscaled image.

20. The apparatus according to claim 17, further comprising a partition tree computation module for computing a binary partition tree structure according to features of training pairs of high-resolution and low-resolution images;

a training image analysis module for computing, for each leaf of the binary partition tree structure, a nonlinear regression function from the training pairs; and a storage module for associating the nonlinear regression function with the respective leaf.

21. The apparatus according to claim 20, further comprising a regression function determining module for traversing the partition tree structure according to the features of the patch, wherein the regression function is determined as being associated with a partition tree leaf.

22. The apparatus according to claim 17, further comprising a patch generating module for dividing the input image into overlapping patches; and a patch analysis module for determining, for each patch, a plurality of geometric features.

23. The apparatus according to claim 17, further comprising a downscaling module for downscaling a training image;

an upscaling module for upscaling the downscaled training image, wherein a coarse version of the training image is obtained;

an image division module for dividing the coarse version of the training image into patches;

a normalizing module for normalizing the patches;

a matrix calculation module for generating a patch matrix Z by stacking a column-vectorized representation of the zero-mean normalized patches, the patch matrix Z having a dimension of PP×N, wherein PP=P×P is the number of pixels per patch and N is the number of patches per training image;

a Singular Value Decomposition module for calculating a Singular Value Decomposition of the patch matrix Z or a subset of the columns of the patch matrix Z, where S is a diagonal matrix of singular values and U, S and $V^T$ are sorted following decreasing singular values in S;

a patch analysis module for determining a direction of maximum variation of the patch matrix Z by calculating the first column of U, wherein the direction of maximum variation is picked as an optimal splitting axis for a current node of the tree structure, and for projecting all columns of the patch matrix Z onto the optimal splitting axis; and a feature decision module for determining a median value of all projections and selecting the median value as a threshold t, determining for each patch whether the projection of its corresponding column in the patch matrix Z is above the threshold t, and assigning each patch to one of two sub-sets of the current node, depending on whether or not the projection of its corresponding column in the patch matrix Z is above the threshold t.

* * * * *